Patented Nov. 17, 1942

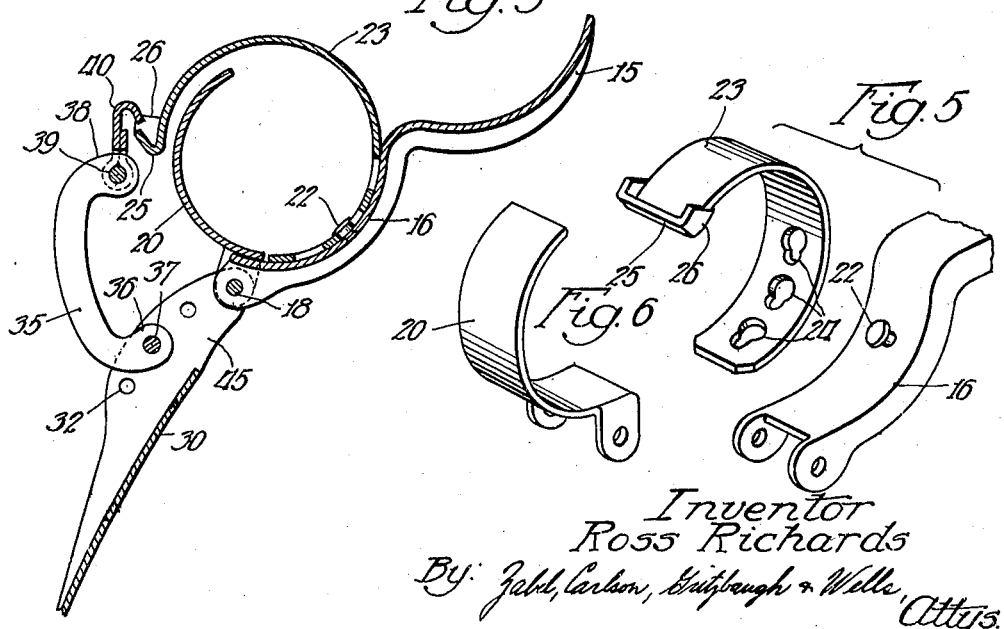

2,302,475

UNITED STATES PATENT OFFICE 2,302,475

HOSE CLAMP

Ross Richards, Chicago, Ill.

Application July 21, 1941, Serial No. 403,379

9 Claims. (Cl. 24—19)

The present invention relates to hose clamps. It particularly is directed to an adjustable clamp adapted to clamp an end of a tubing or hose tightly on a faucet or pipe.

It is an object of the present invention to provide a clamp utilizing two levers operable in the fashion of ordinary shears to tighten the clamp about the hose and pipe. One lever is in "toggle" relationship with an expansible and contractible clamp band whereby movement of the lever to its "dead center" position results in tightening the clamp band to its clamped position. Movement of the lever beyond its "dead center" position causes the clamp band to be held in clamped position. Provision of the two actuating levers enables the clamp to be tightened without the rotation of the clamp or clamp and hose experienced with clamps having only one lever.

A further object of the invention is the provision of a clamp utilizing a toggle principle wherein the "let-back" occasioned by the lever passing over "dead center" to its ultimate clamped position is minimized.

A further object is the provision of a clamp wherein the clamp band is made up of a plurality of segments which are adjustable endwise with respect to each other to provide a clamp for hoses of various diameters to connect on faucets and pipes of various diameters and shapes ranging from round to octagonal to square.

Other objects and advantages of the present invention will appear more fully as the description proceeds, reference being had to the accompanying drawing wherein a preferred embodiment of the invention is shown. It is to be understood, however, that the drawing and description are illustrative only, and are not to be taken as limiting the invention except insofar as it is limited by the claims.

In the drawing,

Fig. 1 is a side elevational view of the clamp in position about a hose and associated pipe, said clamp being shown in closed position;

Fig. 2 is a bottom view of the clamp shown in Fig. 1;

Fig. 3 is a side elevational view partly in cross section of the clamp shown in open position;

Fig. 4 is a sectional view on the line 4—4 of Fig. 1;

Fig. 5 is an explosion view in perspective showing two segments of the clamp band; and, Fig. 6 is a perspective view showing the third segment of the clamp band.

Referring now to the drawing and generally to Fig. 1 thereof, the hose clamp is shown applied around a hose or tubing 10 which engages a pipe or faucet 11. The clamp itself comprises a hand grip 15 which may have a channel cross-section. The hand grip has an arcuate portion 16 which conforms generally to the curved surface of the hose 10. A pin 18 passes through holes in the depending sides of the free end of the arcuate portion 16. The pin 18 is a pivot for certain members presently to be described.

A bendable clamping strip 20 adapted to partially encircle the hose 10 is pivoted to the pin 18. The surface of the pivoted clamping strip 20 forms a continuation of the arcuate portion 16 of the hand grip. Their adjacent ends overlap when in clamping position.

A headed pin 22 extends radially from the surface of the arcuate portion 16 at a point spaced from the free end thereof. Another bendable strip segment 23, which together with portion 16 of the hand grip and pivoted strip 20 constitutes the hose encircling clamp band, has an end portion thereof curved to bear upon the arcuate portion 16 of the hand grip. The said bearing portion of the segment 23 is provided with a plurality of keyhole slots 24 (Fig. 5) which are engaged by the headed pin 22 for various adjustments of the clamp. This segment 23 may be a wire or chain (instead of the strip as shown) to permit the device to be clamped tightly on a hose applied to an octagonal or square pipe. It will be noted that there is only a short distance between the headed pin and the end of portion 16 to which the strip 20 is attached. As will be understood, the circumference of the clamp band may be adjusted within the limits allowed by the various slots 24.

The end of the segment 23 away from the hand grip overlaps the free end of the pivoted strip 20. This overlapping portion has its end turned backwardly to form a hook 25. Lugs 26 are formed on the hook 25 and welded to the sides of the segment for reenforcement.

A hand lever 30 having the approximate length of the hand grip 15 has one end pivoted on pin 18. The hand lever 30 has a channel cross section of narrower width than the hand grip 15. The pivoted end of the hand lever 30 is disposed within the sides of the hand grip and spaced therefrom by washers 31. The depending sides of the channel hand lever 30 are provided with a plurality of oppositely disposed perforations 32 which provide for further adjustment of the clamp, as hereinafter described.

An U-shaped link 35 has the end of its leg 36 pivoted to the hand lever by means of a pin 37 which passes through a pair of the perforations 32 and a hole in said free end. The opposite leg 38 of the link 35 is spaced from the hook 25 of the segment 23. The end of leg 38 is provided with a hole which receives a pivot pin 39. A hook link 40 is pivoted to the pin 39 and is adapted to engage the hook 25 on the segment 23.

Referring now to Fig. 3, the clamp is shown in open position. The hook link 40 may be disengaged from the hook 25 and the U-shaped link 35 may be swung away from the clamp to enable the various segments of the clamp band to be placed around a hose. As will be seen, the hand lever 30 has been pivoted away from the hand grip 15. The circumference of the gripping band may of course be adjusted by means of the various keyhole slots 24 and the headed pin 22. Also it is possible to adjust the link 35 with respect to the hand lever 30 in order to obtain more or less leverage and more or less "draw" of the hook link 40. As will be understood, in the case of a relatively thick hose and one of relatively resilient material, it would be desirable to pivot the leg 36 of the link 35 to a pair of holes 32 more remote from the pivoted end of the hand lever than in a case where less "draw up" of the clamp band is desired.

When the segments of the clamping band are in proper position about the hose, the hook 40 is then associated with the hook 25. The hand lever 30 is then pivoted in a direction toward the hand grip 15 with the result that the amount of overlap between segment 23 and strip 20 increases, thereby reducing the circumference of the clamp band and tightening the clamp. As the hand lever 30 approaches the hand grip 15, the two may be actuated in the fashion of shears, thereby to avoid turning the clamp on the hose. The hand lever 30 is on "dead center" when the point of contact between the two hooks 25 and 40 falls on a straight line with the pivot pins 18 and 37. At this point, the free end of the leg 38 of the U-shaped link 35 rests on the pivoted segment 20 of the clamp band. The hand grip 30 is pivoted further toward hand grip 15 and past "dead center" until its movement is terminated by contact of a portion 45 (Fig. 3) of the hand lever and the underside of the hand grip 15. This limited movement beyond "dead center" of course is necessary to "set" the clamp in closed position. This beyond "dead center" movement of the hand lever necessarily permits a certain amount of "let-back," i. e., loosening of the clamp band after the lever passes "dead center." Inasmuch as there is no further angular movement between the point of contact of the hooks 25 and 40 and the pivot pin 39 after "dead center" is reached, the amount of "let-back" is determined only by the displacement of the pivot pin 39 caused by the lever passing beyond "dead center." This distance of course is equal to the displacement of the pivot pin 37 on the opposite end of link 35.

Referring to Fig. 1, this distance would be measured by first determining the position of the pin 37 when the lever 30 is on "dead center." A circle drawn about pivot pin 39 and through that position would fall slightly beyond the position of pivot pin 37 as shown in Fig. 1. The radial difference between the said circle and the indicated position of pin 37 is the amount of "let-back." This amount of "let-back" is considerably less than would occur if the leg 38 of link 35 itself engaged hook 24. In this latter case, the "let-back" would be measured by centering the circle at the point of contact at the hooks instead of at pivot pin 39. In other words, the provision of hook link 40 pivoted to a point which does not move angularly after the lever passes "dead center" is the feature which reduces the objectionable "let-back" which necessarily occurs in "toggle" devices.

Attention particularly is directed to the segment 20 which is pivoted to the free end of the arcuate portion of the hand grip 15. Provision of this pivoted segment permits the device to be adapted to hoses of widely varying diameters. The adjustable feature of the device is further made possible by the adjustable nature of the segment 23 in its connection to the arcuate portion 16 of the hand grip 15. The segment 23 may of course be a wire or chain to provide better clamping action if the hose is applied to an octagonal or square pipe. As hereinbefore stated, the amount of leverage and "draw" applied to the clamp band may be varied by the provision of the various holes 32 of the hand lever 30.

The provision of the two grips, the hand grip 15 and the hand lever 30, operable in the fashion of shears and pivoted to the portion 20 of the clamp band prevents the clamp or hose or both from twisting around the pipe as the device is being clamped and thus overcomes a material objection to the single lever type of clamp.

From the above description it is thought that the constructions and advantages of the present invention will be readily apparent to those skilled in this art. Having thus described my invention, what I claim as new and desire to secure by Letters Patent is:

1. A hose clamp comprising a clamp band having overlapping segments, a hand grip and hand lever pivoted to said clamp band, a hook on the end of an overlapping segment of the clamp band, a link having one end pivoted to said hand lever and its opposite end removably associated with said hook, whereby movement of the hand grip and hand lever toward each other increases the amount of overlap between the segments of the clamp band and tightens the clamp.

2. A hose clamp comprising a clamp band having overlapping segments, a hand grip and hand lever pivoted to said clamp band, a hook on the end of an overlapping segment of the clamp band, a link having one end pivoted to said hand lever and its opposite end removably associated with said hook, whereby movement of the hand grip and hand lever toward each other increases the amount of overlap between the segments of the clamp band and tightens the clamp, said hand lever being movable beyond "dead center" position to maintain the band in clamped position.

3. A hose clamp comprising a clamp band having overlapping segments, a hand grip and hand lever pivoted to said clamp band, a hook on the end of an overlapping segment of the clamp band, a link having one end pivoted to said hand lever, a hook link pivoted to the opposite end of said link and engageable with said hook, whereby movement of the hand grip and hand lever toward each other increases the amount of overlap between the segments of the clamp band and tightens the clamp.

4. A hose clamp comprising a clamp band having overlapping segments, a hand grip and hand lever pivoted to said clamp band, a hook on the end of an overlapping segment of the clamp band, a link having one end pivoted to said hand lever, a hook link pivoted to the opposite end of said link and engageable with said hook, whereby movement of the hand grip and hand lever toward each other increases the amount of overlap between the segments of the clamp band and tightens the clamp, said hand lever being movable beyond "dead center" position to maintain the band in clamped position, angular movement of the pivoted end of said hook link being limited after "dead center" is reached by contact with said clamp band.

5. A hose clamp comprising a hand grip having an arcuate portion, a headed pin on said arcuate portion, a clamp band comprising overlapping segments, one of said segments having a plurality of keyhole slots engageable with said headed pin for adjustment of said clamp band, another of said segments being pivoted to said hand grip and having its free end underlying the free end of said first segment, a hook at the free end of said first segment, a hand lever pivoted to said hand grip, a link having one end pivoted to said hand lever and its other end removably associated with said hook, whereby movement of the hand grip and hand lever toward each other increases the amount of overlap between the segments of the clamp band and tightens the clamp.

6. A hose clamp comprising a clamp band having overlapping segments, a headed pin on one of said segments engageable with one of a plurality of keyhole slots in a segment overlapped by said first segment to vary the circumference of said clamp band, a hook at the free end of said second segment, a segment having its free end underlying said hook, a hand lever pivoted to said last named segment, a link having one end pivoted to said hand lever, said link being adjustable with respect to the hand lever to vary the extent to which the clamp band may be tightened by actuation of the hand lever, the opposite end of said link being engageable with said hook whereby actuation of said hand lever tightens the clamp.

7. A hose clamp including a clamp band having overlapping segments, the associated ends of two segments being provided with means for varying the amount of overlap, a hook on the end of an overlapping segment, a hand grip and hand lever pivoted to said clamp band at a common point, a link having one end pivotally associated with said hand lever at a point away from the clamp band, said link extending beyond the said pivot point on the clamp band and engageable with said hook to tighten the clamp band as said hand lever is pivoted toward said hand grip.

8. A hose clamp including a clamp band having overlapping segments, the associated ends of two segments being provided with means for varying the amount of overlap, a hook on the end of an overlapping segment, a hand grip and hand lever pivoted to said clamp band at a common point, a link having one end pivotally associated with said hand lever at a point away from the clamp band, said link extending beyond the said pivot point on the clamp band and engageable with said hook to tighten the clamp band as said hand lever is pivoted toward said hand grip, said link being adjustable with respect to the hand lever to vary the extent to which the clamp band may be tightened by actuation of the hand lever.

9. A hose clamp comprising a clamp band having overlapping segments, a hand lever pivoted to said clamp band, a hook on the end of an overlapping segment of the clamp band, a link having one end pivoted to said hand lever, a hook link pivoted to the opposite end of said link and engageable with said hook, whereby movement of the hand lever increases the amount of overlap between the segments of the clamp band and tightens the clamp, said hand lever being movable beyond "dead center" position to maintain the band in clamped position, angular movement of the pivoted end of said hook link being limited after "dead center" is reached by contact with said clamp band.

ROSS RICHARDS.